United States Patent
Mao et al.

(10) Patent No.: US 9,871,432 B2
(45) Date of Patent: Jan. 16, 2018

(54) MICRO VIBRATION MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 201 days.

(21) Appl. No.: 15/069,096

(22) Filed: Mar. 14, 2016

(65) Prior Publication Data

US 2017/0033657 A1 Feb. 2, 2017

(30) Foreign Application Priority Data

Jul. 31, 2015 (CN) .................... 2015 2 0573253 U

(51) Int. Cl.
*H02K 33/00* (2006.01)
*H02K 33/16* (2006.01)

(52) U.S. Cl.
CPC .................... *H02K 33/16* (2013.01)

(58) Field of Classification Search
CPC ........................ H02K 33/00; H02K 33/18
USPC ............................................. 310/15, 25, 28
See application file for complete search history.

(56) References Cited

U.S. PATENT DOCUMENTS

2013/0229070 A1* 9/2013 Akanuma ............ H02K 33/00
310/25
2013/0241321 A1* 9/2013 Akanuma ............ H02K 5/24
310/25

* cited by examiner

*Primary Examiner* — Thanh Lam
(74) *Attorney, Agent, or Firm* — Na Xu; IPro, PLLC

(57) ABSTRACT

A micro vibration motor, includes: a housing having an accumulating space, an elastic support, a vibrator suspended in the accommodation space by the elastic support, and including an upper vibrator in which a magnet is accommodated and a lower vibrator which is parallel to the upper vibrator, the lower vibrator being provided with coils for driving the magnet to vibrate; and a FPC for providing electric signals. The upper vibrator and the lower vibrator are supported by the elastic support including a fixation part connecting with the housing and an annular elastic arm extending from two ends of the fixation part; and the vibrator is surrounded by at least one part of the annular elastic arm and one end of the annular elastic arm is connected to the vibrator.

10 Claims, 3 Drawing Sheets

MICRO VIBRATION MOTOR

FIELD OF THE INVENTION

The present invention relates to the field of vibration feedback, especially to a micro vibration motor in the electronic products.

DESCRIPTION OF RELATED ART

The vibration motor is applied to feedback of the system generally, such as incoming call prompt, message prompt and navigation prompt of mobile phone, vibration feedback of game player, etc. for the portable consumer electronic products which are favored by more and more people along with development of the electronic technologies, such as mobile phone, handheld game player, navigation unit or handheld multimedia entertainment equipment, etc. Thus, the vibration motor is required to have obvious vibration effect and simple assembling as a result of such wide application.

The vibration motor which is used widely is the flat linear vibration motor so far, which includes a housing having an accommodation space, a vibrator and an elastic support for supporting the vibrator. The linear vibration motor is equipped with one vibrator and each vibrator shall be equipped with two or four U-shaped elastic supports. The above-mentioned structure has defects, for example, the single vibrator has weak vibration effect, multiple elements, long assembling time and low efficiency.

Therefore, it is necessary to provide a new vibration motor to overcome the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
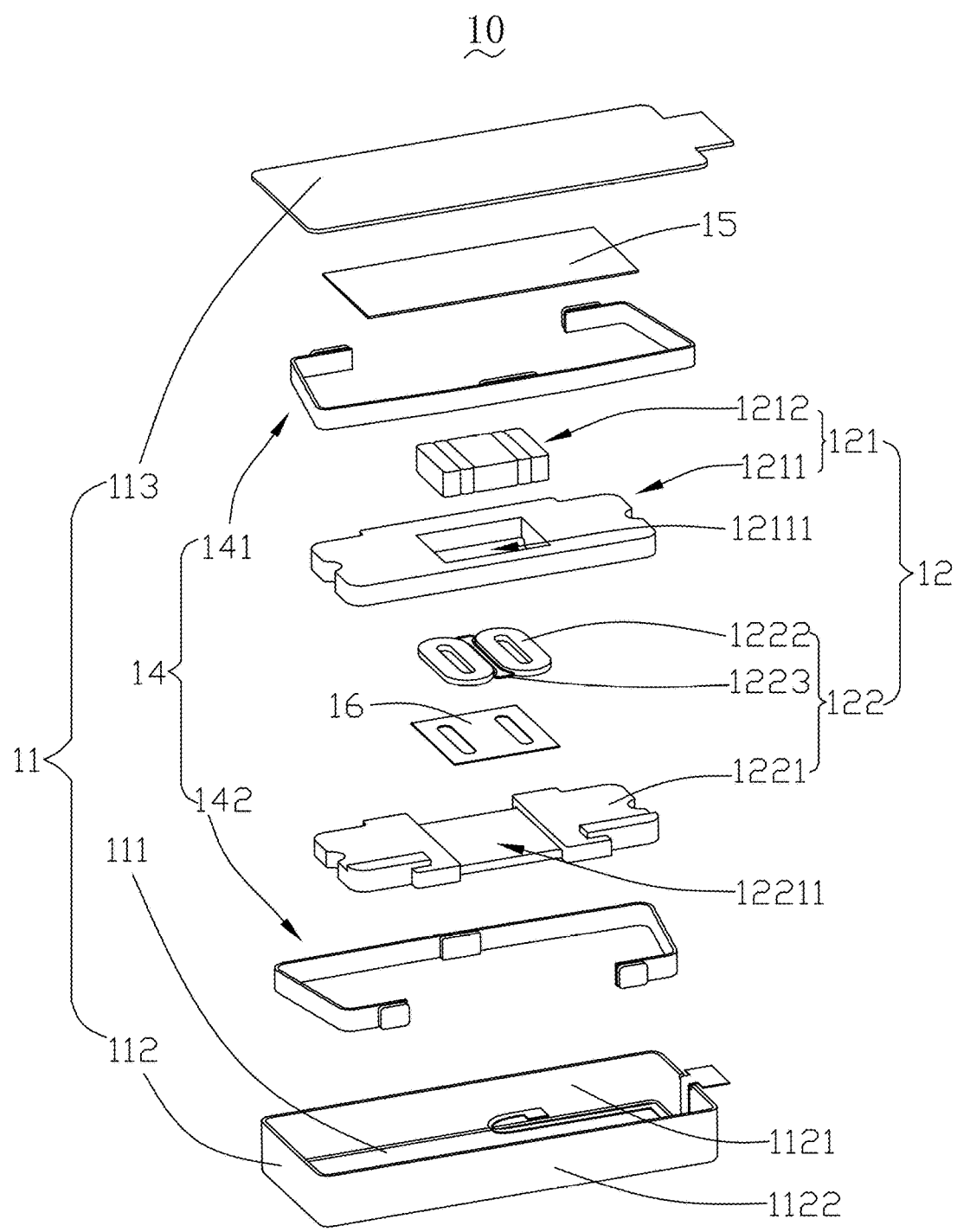
FIG. 1 is an isometric and exploded view of a micro vibration motor in accordance with an exemplary embodiment of the present disclosure.

Referring to FIG. 1, a micro vibration motor 10 in accordance with an exemplary embodiment of the present disclosure comprises a housing 11, a vibrator 12, an elastic support 14, an upper pole piece 15 and a lower pole piece 16.

The housing 11 comprises a bottom surface 111, a wall 112 and a cover plate 113. The wall 112 includes a first wall 1121 and a second wall 1122 parallel with each other. The bottom surface 111 and the cover plate 1113 are arranged oppositely with interval; an accommodation space is formed by the wall 112 matching with the bottom surface 111 and the cover plate 113 in order to accommodate the vibrator 12, the elastic support 14, the upper pole piece 15 and the lower pole piece 16.

The vibrator 12 includes an upper vibrator 121 and a lower vibrator 122 which are overlapped in sequence. The upper vibrator 121 includes an upper balancing weight 1211 and a magnet 1212; the upper balancing weight 1211 is provided with a through hole 12111 in which the magnet 1212 is fixed correspondingly.

The lower vibrator 122 includes a lower balancing weight 1221 having the accommodation space 12211, two coils 1222 which are arranged parallel and a FPC board 1233; the accommodation space 12211 is arranged on the side near the upper vibrator 121, and the FPC board 1223 is connected with the coils 1222 and accommodated in the accommodation space 12211 of the lower balancing weight 1221 with the coils 1222 jointly.

The FPC board 1223 is connected with the two coils 1222; a double-layer vibrator is formed by the upper vibrator and the lower vibrator 122 and further improves the vibration effect of the micro vibration motor 10 while improving the electromagnetic force of the internal part of the micro vibration motor 10 obviously.

The vibrator 12 is connected with one end of the elastic support 14 and fixed in the accommodation space in suspending way by using the elastic support 14.

The other end of the elastic support 14 is connected with the housing 11. The elastic support 14 comprises a first elastic support 141 for supporting and fixing the upper vibrator 121 and a second elastic support 142 for supporting and fixing the lower vibrator 122; the two elastic supports 141 and 142 have completely identical structure, and are arranged parallel and oppositely.

Figure 2:
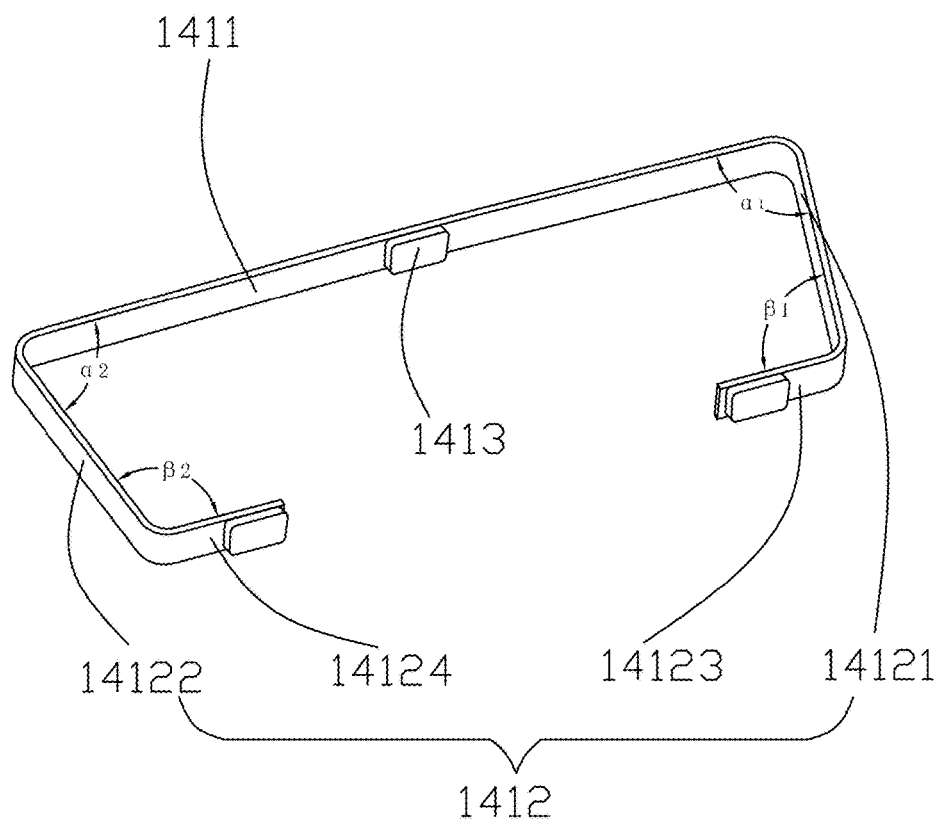
FIG. 2 is an isometric view of a first elastic support of the micro vibration motor.

The stereogram of the first elastic support of the micro vibration motor is shown in FIG. 1 by referring to FIG. 2. Each of said first elastic support 141 and the second elastic support 142 includes a fixation part 1411, an annular elastic arm 1412 and a soldering lug 1413, respectively.

The annular elastic arm 1412 includes a first side arm 14121, a second side arm 14122, a first holding part 14123 and a second holding part 14124. The fixation part 1411 is presented as a long strip integrally, and the two ends thereof are connected with the first side arm 14121 and the second side arm 14122 respectively; the two ends of the first side arm 14121 are connected with the fixation part 1411 and the first holding part 14123 respectively, while the two ends of the second side arm 14122 are connected with the fixation part 1411 and the second holding part 14124, respectively. The first side arm 14121 and the second side arm 14122 are formed after bending and extending toward identical side from two ends of the fixation part 1411; the included angle formed between the fixation part 1411 and the first side arm 14121 is $\alpha 1$, and the included angle formed between the fixation part 1411 and the second side arm 14122 is $\alpha 2$, the $\alpha 1$ and $\alpha 2$ are equal. The first holding part 14123 and the second holding part 14124 are formed after bending and extending toward the opposite sides from one end of the first side arm 14124 and one end of the second side arm 14122 far from the fixation part 1411; the included angle formed between the first side arm 14121 and the first holding part 14123 is $\beta 1$, and the included angle formed between the second side arm 14122 and the second holding part 14124 is $\beta 2$, the $\beta 1$ and $\beta 2$ are equal. The fixation part 1411, the first side arm 14121, the second side arm 14122, the first holding part 14123 and the second holding part 14124 are formed integrally, thereby forming a C-shaped structure jointly; moreover, the vibrator 12 is accommodated in the hollow area of the C-shaped structure correspondingly.

In the elastic supports 141 and 142, the fixation part 1411 is presented as an arc; therefore, the fixation part 1411 is not adhered to the wall 112 completely; and the annular elastic arm 1412 can swing freely and completely.

The ends of the holding parts 14123 and 14124 are arranged as the free ends; therefore, given that the elastic supports 141 and 142 are characterized with elastic deformation, the holding parts 14123 and 14124 can implement relatively elastic deformation within the range prescribed with respect to the fixation part 1411 and generate recovery trend when meeting external force while other elements are held by the elastic supports 141 and 142, and the vibrators 121, 122 can be fixed therein effectively as a result of this recovery elastic force, and the elastic wrapping and fixation effects of the elastic supports 141 and 142 can be carried out.

The soldering lug 1413 is arranged on one side of the fixation part 1411 close to the vibrator 121 and one side of the holding parts 14123 and 14124 far from the vibrators 121 and 122.

The upper pole piece 15 is fixed on the side of the upper vibrator 121 far from the lower vibrator 122; the lower pole piece 16 is fixed in the accommodation space 1221 of the lower vibrator 122 and is located on one side of the coils 1222 far from the upper vibrator 121. Moreover, the upper pole piece 15 and the lower pole piece 16 can prevent magnetic leakage and increase the vibration effect of the micro vibration motor 10 while improving the force of the electromagnetic field.

The micro vibration motor 10 can be assembled according to following steps:

First, accommodate the vibrator 12, the elastic support 14, the upper pole piece 15 and the lower pole piece 16 after providing the housing 11.

Then fix the magnet 1212 at the through hole 12111 of the upper balancing weight 1211 and fix the upper pole piece 15 on the surface of the upper balancing weight 1211.

And connect the FPC plate 1223 between the two coils 1222 after placing the two coils 1222 and the bottom surface of the FPC plate 1223 on identical plain, and fix the other surface of the lower pole piece 16 on the accommodation space 12211 of the balancing weight 1221 while fix the FPC plate 1223 and the two coils 1222 on the surface of the lower pole piece 16 jointly.

Then connect the internal sides of the holding parts 14123, 14124 with the side of the upper vibrator 121 while placing the upper vibrator 121 in the C-shaped surrounding space of the first elastic support 141; keep and fix the upper vibrator 121 on the side of the upper pole piece 15 in order to let the opening of the C-shaped surrounding space of the first elastic support 141 be close to the first wall 1121; moreover, connect the external side of the fixation part 1411 of the first elastic support 141 with the second wall 1122.

And then connect the internal sides of the holding part 14123 and 14124 of the second elastic support 142 with the side of the lower vibrator 122 while placing the lower vibrator 122 in the C-shaped surrounding space of the second elastic support 142; place the side of the lower vibrator 122 fixing the coils 1222 close to the side of the upper vibrator 121 far from the upper pole piece 15, overlap the vibrators 121 and 122 parallel with interval; moreover, connect the external side of the fixation part 1411 with the first wall 1121 after placing the C-shaped surrounding space of the second elastic support 142 close to the second wall 1122.

Figure 3:
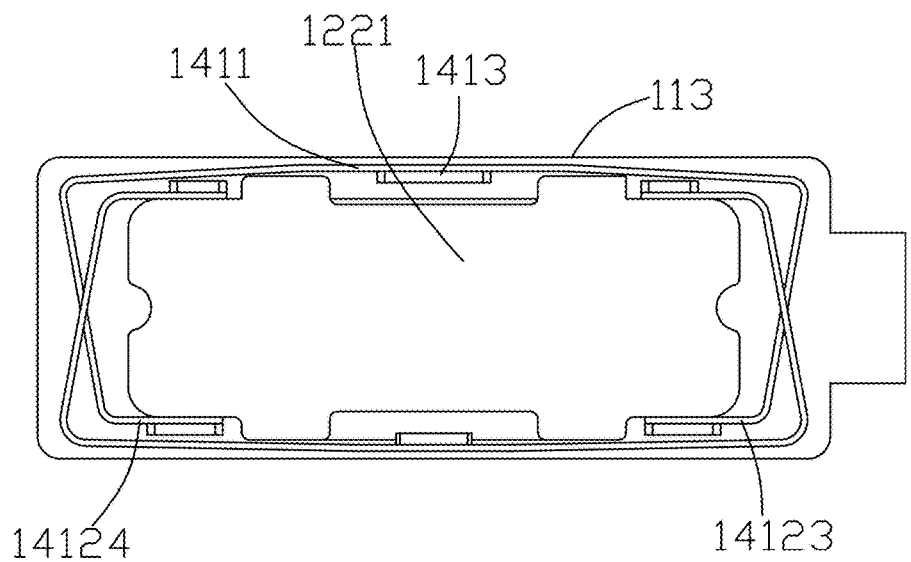
FIG. 3 is a bottom view of the micro vibration motor.

The upward view of one part of the structure of the micro vibration motor is shown in FIG. 1 by referring to FIG. 3. Moreover, the first elastic support 141 and the second elastic support 142 shall be arranged parallel and oppositely and the internal structure of the micro vibration motor 10 shall be assembled by using the above-mentioned assembling steps.

Finally, assemble the micro vibration motor 10 completely after joining the cover plate 113 of the housing 11 with the wall 112 of the housing 11.

The upper vibrator 121 or the lower vibrator 122 shall vibrate within the range surrounded by the elastic supports 141 and 142, and the elastic supports 141 and 142 shall provide the upper vibrator 121 or the lower vibrator 122 with resetting forces as a result of design that $\alpha 1$ and $\alpha 2$ are less than $\beta 1$ and $\beta 2$ when the micro vibration motor 10 is in status of vibration; further, this design can also limit the change of location of the vibrator in order to prevent the vibrators 121 and 122 from dislocation out of the range surrounded by the elastic supports 141 and 142 when meeting longitudinal falling of the electronic product. Moreover, the left amplitude and the right amplitude of the vibrators 121 and 122 shall be consistent with each other during vibration due to design that $\alpha 1$ is equal to $\alpha 2$ and $\beta 1$ is equal to $\beta 2$.

The force of the electromagnetic field of the internal part of the micro vibration motor 10 is improved obviously, and the vibration effect of the micro vibration motor 10 is further enhanced as a result of the double-layer vibrator structure composed of the upper vibrator 121 and the lower vibrator 122 and adopted by the micro vibration motor 10 of the utility model compared with the relevant technology. Moreover, the assembling time is shortened because the elastic supports 141 and 142 form the integrated annular structure and one of the elastic supports 141 and 142 is required by each of the vibrators 121 and 122 only.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A micro vibration motor, comprising:
a housing having an accumulating space,
an elastic support,
a vibrator suspended in the accommodation space by the elastic support, and including an upper vibrator in which a magnet is accommodated and a lower vibrator which is parallel to the upper vibrator, the lower vibrator being provided with coils for driving the magnet to vibrate;
a FPC for providing electric signals; wherein
the upper vibrator and the lower vibrator are supported by the elastic support including a fixation part connecting with the housing and an annular elastic arm extending from two ends of the fixation part; and the vibrator is surrounded by at least one part of the annular elastic arm and one end of the annular elastic arm is connected to the vibrator.

2. The micro vibration motor as described in claim 1, wherein the elastic support includes a first elastic support for supporting the upper vibrator and a lower elastic support for supporting the lower vibrator; and the first elastic support and the second elastic support are opposite to each other.

3. The micro vibration motor as described in claim 1, wherein the annular elastic arm includes a first side arm and a second side arm which extend from two ends of the fixation part respectively and a first holding part and a second holding part which extend from the first side arm and the second side arm respectively and connect with the vibrator fixedly.

4. The micro vibration motor as described in claim 3, wherein an angle formed by the first side arm and the fixation part is less than that formed by the side first side arm and the first holding part, while an angle formed by the second side arm and the fixation part is less than that formed by the second side arm and the second holding part.

5. The micro vibration motor as described in claim 3, wherein an angle formed by the first side arm and the fixation part is equal to that formed by the second side arm and the fixation part, while an angle formed by the first side arm and the first holding part is equal to that formed by the second side arm and the second holding part.

6. The micro vibration motor as described in claim 1, wherein the lower vibrator includes a lower balancing weight which has a accommodation space, a FPC board and the coils; the accommodation space is arranged on the side near the upper vibrator; the FPC board and the coils are accommodated in the accommodation spaced and are connected correspondingly.

7. The micro vibration motor as described in claim 6 further comprising a lower pole piece which is fixed in the accommodation space and located on the side of the coils far from the upper vibrator.

8. The micro vibration motor as described in claim 7, wherein the amount of the coils is 2, and the two coils are arranged parallel and connected serially by using the FPC board.

9. The micro vibration motor as described in claim 1 further comprising an upper pole piece which is located on the side of the upper vibrator far from the lower vibrator.

10. The Micro vibration motor as described in claim 3 further comprising a soldering lug which is arranged on the elastic support, one side of the fixation part near the vibrator and one side of the first holding part and the second holding part respectively far from the vibrator.

* * * * *